United States Patent
Lachwani et al.

(10) Patent No.: US 8,826,240 B1
(45) Date of Patent: Sep. 2, 2014

(54) APPLICATION VALIDATION THROUGH OBJECT LEVEL HIERARCHY ANALYSIS

(71) Applicant: Appurify, Inc., San Francisco, CA (US)

(72) Inventors: Manish Lachwani, Sunnyvale, CA (US); Jay Srinivasan, San Francisco, CA (US); Rahul Jain, San Francisco, CA (US); Pratyus Patnaik, San Francisco, CA (US)

(73) Assignee: Appurify, Inc., San Francisco, CA (US)

( * ) Notice: Subject to any disclaimer, the term of this patent is extended or adjusted under 35 U.S.C. 154(b) by 33 days.

(21) Appl. No.: 13/631,919

(22) Filed: Sep. 29, 2012

(51) Int. Cl.
*G06F 9/44* (2006.01)
*G06F 9/45* (2006.01)
*G06F 11/00* (2006.01)

(52) U.S. Cl.
USPC .......... 717/126; 717/130; 717/131; 717/141; 717/144; 714/38.1

(58) Field of Classification Search
None
See application file for complete search history.

(56) References Cited

U.S. PATENT DOCUMENTS

| | | | | |
|---|---|---|---|---|
| 4,953,084 A * | 8/1990 | Meloy et al. | ................. | 717/131 |
| 6,131,188 A * | 10/2000 | Goebel | ......................... | 717/141 |
| 6,151,701 A * | 11/2000 | Humphreys et al. | ............ | 717/130 |
| 6,598,221 B1 * | 7/2003 | Pegatoquet et al. | ............ | 717/152 |
| 6,829,733 B2 * | 12/2004 | Richardson et al. | ......... | 714/38.1 |
| 7,051,238 B2 * | 5/2006 | Gardner et al. | ............ | 714/38.13 |
| 7,418,697 B2 * | 8/2008 | Gryko et al. | ................. | 717/124 |
| 7,805,707 B2 * | 9/2010 | Pouliot | ......................... | 717/124 |
| 7,870,540 B2 * | 1/2011 | Zare et al. | ..................... | 717/126 |
| 7,991,747 B1 | 8/2011 | Upadhyay et al. | | |
| 8,370,810 B2 * | 2/2013 | Oda | .............................. | 717/125 |
| 8,479,166 B2 * | 7/2013 | Nir-Buchbinder et al. | ... | 717/126 |
| 8,671,080 B1 | 3/2014 | Upadhyay et al. | | |
| 2002/0010710 A1 * | 1/2002 | Binnig | ......................... | 707/500 |
| 2002/0040470 A1 * | 4/2002 | Guthrie et al. | ................ | 717/126 |
| 2002/0166081 A1 * | 11/2002 | Richardson et al. | ............ | 714/33 |
| 2003/0221184 A1 * | 11/2003 | Gunjal et al. | .................. | 717/118 |
| 2005/0273776 A1 * | 12/2005 | Guilford | ........................ | 717/144 |
| 2005/0278707 A1 * | 12/2005 | Guilford | ........................ | 717/130 |
| 2006/0059253 A1 | 3/2006 | Goodman et al. | | |
| 2009/0150420 A1 * | 6/2009 | Towner | ......................... | 707/101 |
| 2011/0047597 A1 | 2/2011 | Mahaffey et al. | | |
| 2011/0289483 A1 | 11/2011 | Williams et al. | | |

(Continued)

OTHER PUBLICATIONS

Giglielmo et al, "Model driven design and validation of embedded software", 2011 ACM, pp. 98-104, [Retrieved from Internet on Jun. 28, 2014], <http://dbonline.igroupnet.com/ACM.TOOLS/Rawdata/Acm1106/fulltext/1990000/1982616/p98-guglielmo.pdf>.*

(Continued)

*Primary Examiner* — Thuy Dao
*Assistant Examiner* — Ziaul A Chowdhury
(74) *Attorney, Agent, or Firm* — Lindauer Law, PLLC

(57) ABSTRACT

Application validation is performed based at least in part on object level hierarchy data associated with the application. An application is executed on a physical or emulated host device, and assembly code is generated for the executing application. The assembly code is analyzed to identify objects associated with the application, and to identify relationships between the objects. Based on the object and relationship data, an object level hierarchy is generated for the application. Validation of the application may be performed by comparing an object level hierarchy for a current version of the application to a previously generated hierarchy for a previous version of the application to identify differences between to the two hierarchies.

30 Claims, 13 Drawing Sheets

(56) References Cited

U.S. PATENT DOCUMENTS

| | | | |
|---|---|---|---|
| 2012/0260344 | A1 | 10/2012 | Maor et al. |
| 2013/0152047 | A1* | 6/2013 | Moorthi et al. ............... 717/124 |
| 2013/0185798 | A1 | 7/2013 | Saunders et al. |
| 2013/0227636 | A1 | 8/2013 | Bettini et al. |
| 2013/0276061 | A1 | 10/2013 | Chebiyyam et al. |
| 2014/0020096 | A1 | 1/2014 | Khan et al. |
| 2014/0082729 | A1 | 3/2014 | Shim et al. |

OTHER PUBLICATIONS

Rueher, et al., "Capturing Software Processes Through the Generated Objects", 1988, pp. 148-152, [Retrieved from Internet on Jun. 28, 2014], <http://delivery.acm.org/10.1145/80000/75138/p148-rueher.pdf>.*

Alan Dearle, "Software Deployment, Past, Present and Future", IEEE 2007, pp. 1-16, [Retrieved from Inernet on Jun. 28, 2014], <http://www.cs.tufts.edu/comp/250SA/papers/dearle2007.pdf>.*

Bakos, et al., "Lightweight Error Correction Coding for System-level Interconnects," IEEE 2007, pp. 289-304, [Retrieved from Internet on Jun. 28, 2014], <http://kona.ee.pitt.edu/steve/Recent%20Publications/TC_2007_TC-0414-1105-1.pdf>.*

Pyzocha, "Non Final Office Action dated May 13, 2014", U.S. Appl. No. 13/655,667, The United States Patent and Trademark Office, May 13, 2014.

"debugserver", [online] [retrieved on Apr. 22, 2014] Retrieved from the Internet:http://iphonedevwiki.net/index.php/Debugserver.

LLDB.LLVM.ORG, "The LLDB Debugger", [online] [retrieved Apr. 22, 2014] Retrieved from the Internet: <http://lldb.llvm.org/>.

Lu, Charles , "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Paul, Javin , "How to setup Java remote debugging in Eclipse", Javarevisited—Blog about Java programming language, FIX Protocol, Tibco Rendezvous and related Java technology stack, Feb. 25, 2011, [online] [retrieved Apr. 22, 2014]. Retrieved from the Internet: http://javarevisited.blogspot.com/2011/02/how-to-setup-remote-debugging-in.html.

Coyer, "Non Final Office Action dated Jun. 5, 2014", U.S. Appl. No. 13/721,632, The United States Patent and Trademark Office, Jun. 5, 2014.

\* cited by examiner

```
                                                                    ┌─ 900
<__NSArrayI 0x7c4ce80>(
{
  CGRect = <00000000 00000000 0000a043 0000f043>;
  Children =   (
      {
      CGRect = <00000000 00000000 0000a043 0000f043>;
      Children =        (
              {
          CGRect = <00000000 00000000 0000a043 0000f043>;
          Children =            (
                  {
              CGRect = <00000000 00008042 0000a043 0000d043>;
              Children =               (
                      {
                  CGRect = <00000000 00008042 0000a043 0000d043>;
                  Children =                  (
                          {
                      CGRect = <00000000 00008042 0000a043 0000a041>;
                      Children =                     (
                                  {
                              CGRect = <00002041 00008042 0000a043 00009841>;
                              ClassName = UILabel;
                   904        Enabled = 1;
                              ID = "TOP STORIES";
                              Type = UIView;
                          },
                                  {
                              CGRect = <00000000 0000a442 0000a043 0000803f>;
        902                   ClassName = UIView;
                   906        Enabled = 1;
                              ID = "<UIView: 0x4e7470>";
                              Type = UIView;
                          },
                                  {
                              CGRect = <00000000 0000a642 0000a043 0000803f>;
                              ClassName = UIView;
                   908        Enabled = 1;
                              ID = "<UIView: 0x4c2df0>";
                              Type = UIView;
                          }
                      );
```

APPLICATION VALIDATION THROUGH OBJECT LEVEL HIERARCHY ANALYSIS

BACKGROUND

For many software developers, testing of software applications for quality control or quality assurance is an important precursor to a software release. Traditional methods of software testing may be time intensive for operators performing the testing, and may also use significant computational resources to run. Furthermore, these methods may generate false positives of errors or "bugs" when minor changes are made to the user interface (UI) for design or usability improvements during the software development process. For example, a cosmetic change to a graphic in the UI may result in detection of the change as a bug even though the development team does not consider the change to be a bug.

BRIEF DESCRIPTION OF THE DRAWINGS

FIG. 9 depicts at least a portion of an example object level hierarchy for an application.

Figure 1:
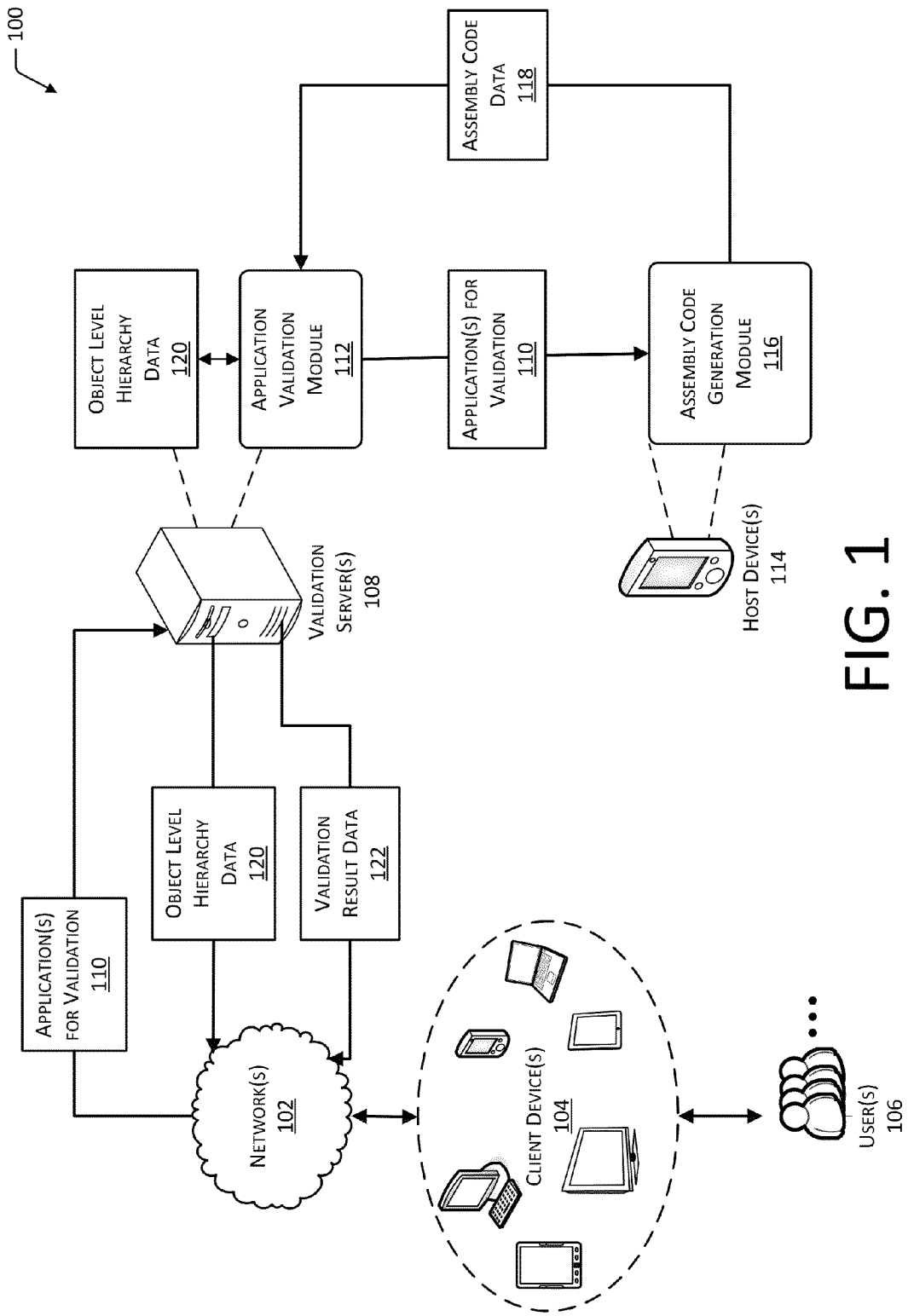
FIG. 1 depicts an environment for application validation through object level hierarchy analysis.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Overview

This disclosure describes embodiments of systems, methods, and computer-readable media to enable generation of an object level hierarchy for an application. The object level hierarchy may be analyzed to validate the application. Embodiments support validation of any type of software application, program, module, or process executing on, or part of, any type of operating system. For example, applications may be validated which are configured for execution on mobile, desktop, laptop, server, or other devices and their corresponding operating systems. As used herein, validation of an application may include comparing a current version of an application to another version to identify differences such as regressions and potential bugs in the current version. Validation may also include analyzing data in the various objects of the object level hierarchy to verify that such data corresponds to a target character set (e.g., for localization of the application), or other criteria. In some embodiments, a user may log in or otherwise be authenticated to a validation server. Through a user interface (UI) provided by the validation server, the user may specify and upload an application for validation, and select a host device on which the application is to be validated. The selection of the host device may include selection of one or more of a particular device, device type, operating system, or other attributes of the host device.

The validation server may remotely operate the host device to upload the application to the host device, install the application on the host device, and execute the application on the host device. The validation server may also remotely operate the host device to execute an assembly code generation module on the host device. In some embodiments, the assembly code generation module generates assembly code data associated with the executing application. The assembly code data may include assembly code instructions, assembly code descriptions of program objects associated with the application, or both. In some embodiments, the assembly code generation module is a debugger.

In some embodiments, an application validation module on the validation server builds an object level hierarchy for the application, based on the assembly code generated by the assembly code generation module on the host device. In some cases, the validation server may iteratively query the assembly code on the host device to determine parent/child hierarchical relationships between various objects associated with the application. The object level hierarchy may then be built based on these determined parent/child relationships. In some embodiments, the objects employed to build the object level hierarchy include those objects associated with a particular object type, aspect, or feature set of the application. For example, embodiments may provide an object level hierarchy of objects associated with UI elements of the application under validation, or associated with memory management features of the application.

Having generated the object level hierarchy, embodiments may validate the application based on an analysis of the object level hierarchy. In some embodiments, validation includes comparing an object level hierarchy for a current version of the application to a baseline object level hierarchy previously generated for a previous version of the application. Differences between the current version and the previous version may then be identified. Embodiments may identify one or more of differences in the number or identity of objects in the hierarchy, differences in the relationships between the objects, or differences in one or more attributes associated with the objects. In this way, embodiments may identify regressions or bugs in a particular feature set of the application through comparison of object level hierarchies generated for multiple versions of the application. For example, embodiments may identify changes in an application's UI for an application based on an analysis of the object level hierarchy. Such an analysis may be less resource intensive than identifying UI changes through a comparison of large files containing screenshot images.

In some embodiments, validation of an application may include extracting text attributes from objects in the application's object level hierarchy. These text attributes may be provided as a report, to allow a user to review the text attributes displayed within UI elements of the application. Such a report may be reviewed by a user to verify that localization of the application has been performed accurately. As used herein, localization refers to a process by which an application is modified or adapted to be suitable for a particular language, country, region, or locale where the application may be used. Localization may include translation of text into a different language, adaptation of syntax, grammar, or punctuation, or other modifications of visual or auditory elements within an application. In some embodiments, validation may also include checking that characters in the text attributes for objects in an object level hierarchy correspond to a target character set for the localized application.

In some embodiments information in the object level hierarchy may be used to place the application into a pre-determined state. Images or screenshots of the UI display may be acquired and compared to determine correspondence with an expected screen shot.

Embodiments are described further herein with reference to the figures.

Illustrative Environment

FIG. 1 shows an example environment 100 in which various embodiments of application validation may operate. In embodiments, the various devices and modules of the environment 100 may communicate with one another and with external devices via one or more networks 102. Such networks 102 may include public networks such as the Internet, private networks such as an institutional or personal intranet, or some combination of private and public networks. The networks may also include any type of wired or wireless network, including but not limited to local area networks (LANs), wide area networks (WANs), Wi-Fi, WiMax, and mobile communications networks (e.g. 3G, 4G, and so forth). The networks may utilize communications protocols, including packet-based or datagram-based protocols such as internet protocol (IP), transmission control protocol (TCP), user datagram protocol (UDP), or other types of protocols.

In some embodiments, the environment 100 includes one or more client devices 104 that are owned by, operated by, or otherwise associated with one or more users 106. The client devices 104 may include any type of computing device that is able to communicate with other devices over a network, including but not limited to desktop computers, personal computers, laptop computers, tablet computers, electronic book readers, wearable computers, implanted computers, mobile phones, thin clients, terminals, game consoles, mobile gaming devices, and the like. In some embodiments, the client devices 104 include one or more applications that provide a user interface to connect with a remotely hosted service. For example, the client devices 104 may run a web browser to enable the user(s) 106 to view and interface with a web site.

Embodiments support the use of various web browsers including, but not limited to, Mozilla® Firefox®, Microsoft® Internet Explorer®, Google® Chrome®, Apple® Safari®, Rockmelt®, and other browsers. In some embodiments the user 106 may communicate with a remote service via some other type of application, or through a dedicated client-side application. The user(s) 106 may include any individual person, group of persons, or automated process. For example, the user(s) 106 may include app developers, software engineers, other members of an application development organization, and the like, who may employ embodiments to validate an application during or after its development process.

In some embodiments, the environment 100 includes one or more server computing devices. Such servers may include any type of computing device including, but not limited to, network servers, rack-mounted servers, workstations, desktop computers, laptop computers, tablet computers, mobile computing devices, virtual servers, cloud resources, and the like. Further, the servers shown may include one or more computing devices that operate in a cluster or other grouped configuration to share resources, balance load, increase performance, provide fail-over support or redundancy, or for other purposes. The servers may also include one or more hardware modules and one or more software modules (e.g., processes or applications) to perform tasks as described herein.

As shown in FIG. 1, the environment 100 includes one or more validation servers 108. In embodiments, the validation server(s) 108 may receive (e.g., from users 106) one or more applications for validation 110. In some embodiments, the validation server(s) 108 run one or more software modules, processes, or applications that comprise an application validation module 112. In some embodiments, the application validation module 112 may provide a user interface that is accessible to the user(s) 106, e.g., through a web browser executing on the client devices 104. The user interface may enable a user to send instructions and receive data associated with application validation operations. An example user interface for the application validation service is described with regard to FIG. 4.

The environment 100 may also include one or more host devices 114 available for performing application validation operations. Such host device(s) 114 may include various types of computing devices, operating systems, software, firmware, and so forth. In some embodiments, the host device(s) 114 include mobile computing devices such as smartphones, tablets, eBook readers, wearable computers, automotive computers, and the like. However, embodiments are not so limited, and embodiments may support any type of host device for application validation, including but not limited to desktop computers, laptop computers, network computers, server computers, mainframe computers, and so forth. In some embodiments the host device 114 may be emulated in software. For example, the host device 114 may comprise a software emulator of the host device 114 which is executed on the validation server 108.

In embodiments, the host device(s) 114 may include one or more software modules such as an assembly code generation module 116. In some embodiments, the application validation module 112 transmits or otherwise provides the application(s) for validation 110 to the host device(s) 114, to enable the application(s) to be validated with respect to one or more particular host device(s) 114. In some embodiments, the application(s) for validation 110 may be provided to the host device(s) 114 from a computing device other than the validation server(s) 108. The application(s) for validation 110 may be executed on the host device(s) 114, and the assembly code generation module 116 may operate to produce assembly code associated with the executing applications. In some embodiments, the assembly code generation module 116 may be a debugger such as the GNU debugger (gdb), or may include at least a portion of the functionality of a debugger. However, embodiments are not so limited, and any type of the assembly code generation module 116 may be employed to generate the assembly code data 118 for an application or verify that a compiled application is suitable for the hardware configuration of the host device 114 on which it is to execute.

In some embodiments, the assembly code generation module 116 generates the assembly code data 118 associated with the application(s) for validation 110 executing on the host device(s) 114. The assembly code data 118 may be transferred to the application validation module 112, which may then use the assembly code data 118 to generate object level hierarchy data 120 associated with the application(s) for validation 110. The object level hierarchy data 120 indicates a hierarchical association between the plurality of objects, based on one or more determined parent-child relationships between the objects. In some embodiments, the application validation module 112 may iteratively request portions of the assembly code data 118 to analyze address data for objects listed in the assembly code data 118, determine parent-child relationships among the objects, or generate one or more object level hierarchies based on the objects and their relationships. As used herein, address data describes addresses for locations in virtual memory on the device where the application for validation 110 is executing. Address data may also describe addresses for locations in active memory or program memory on a device. The generated object level hierarchy data 120 may be stored on the validation server(s) 108, or on a data storage device or other computing device external to and in communication with the validation server(s) 108. For example, the object level hierarchy data 120 may be provided to the client device 104 for further analysis.

The application validation module 112 may also analyze the object level hierarchy data 120 to validate the application(s) for validation 110. Such validation may result in validation result data 122, which may be provided to the user(s) 106 (e.g., through a user interface of the application validation module 112), or may be stored on the validation server(s) 108 and made available in response to a request for the validation result data 122. In some embodiments, the validation result data 122 may include at least a portion of the object level hierarchy data 120, or the object level hierarchy data 120 may be provided to the client device 104 separately from the validation result data 122. The validation result data 122 or the provided object level hierarchy data 120 may also include metadata describing data elements within the object level hierarchy data 120.

In some embodiments, various operations of the assembly code generation module 116 or other operations of the host device(s) 114 may be remotely controlled from the validation server(s) 108. In some cases, the remote control may be accomplished through systems and methods described in U.S. patent application Ser. No. 13/619,867, filed on Sep. 14, 2012, titled "Remote Control of a Mobile Device," which is incorporated by reference into this disclosure. In some embodiments, the validation server(s) 108 may include functionality of the remote control server(s) described in "Remote Control of a Mobile Device," or may communicate with such remote control server(s), to send instructions to or receive data from the host device(s) 114.

In some embodiments, the application validation operations described herein may be performed using an emulation of a host device, instead of or in addition to using a physical host device 114. An emulation of a host device may execute on the validation server(s) 108 or on another computing device, and may run an operating system or applications that would otherwise execute on the physical host device 114. In such cases, the application(s) for validation 110 may be copied to, installed on, and executed on the emulation of the host device 114, and the assembly code generation module 116 may execute on the emulation to generate the assembly code data 118.

In some implementations the emulation may be configured to provide the assembly code data 118 without an additional or separate assembly code generation module 116. For example, the emulator may be configured to output the assembly code data 118 for the applications executing in the emulator to the operating system within which the emulator is executing.

Illustrative Computing Systems

Figure 2:
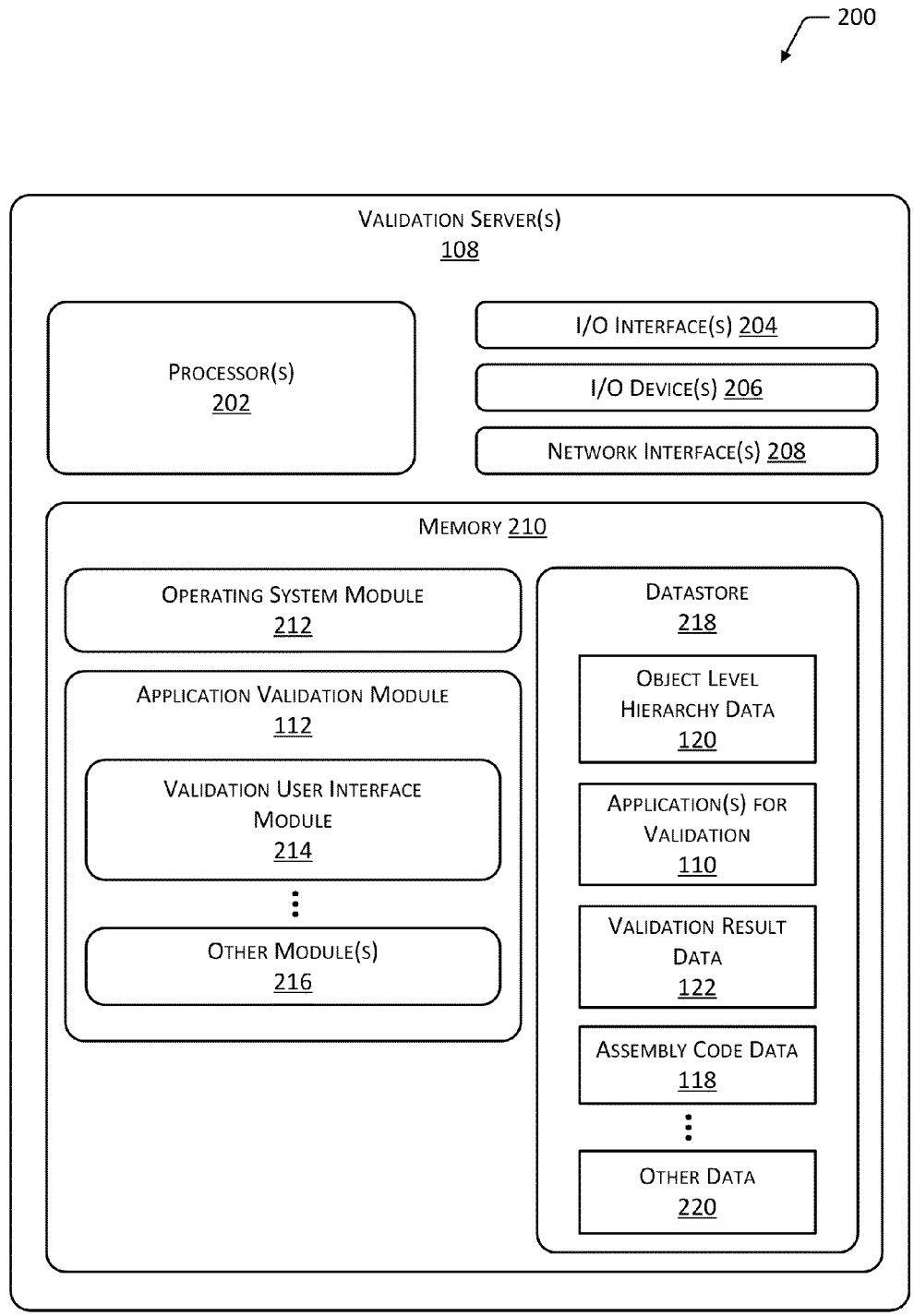
FIG. 2 depicts a block diagram of a validation server device configured to perform operations for application validation.

FIG. 2 depicts a block diagram 200 of the validation server(s) 108 that may be used to implement various embodiments described herein. The validation server(s) 108 may include one or more processors 202 configured to execute one or more stored instructions. The processors 202 may comprise one or more cores.

The validation server(s) 108 may include one or more input/output (I/O) interface(s) 204 to allow the validation server(s) 108 to communicate with other devices. For example, the I/O interface(s) 204 may be configured to provide a universal serial bus (USB) connection compliant with the standards promulgated by the USB Implementers Forum, Inc. of Beaverton, Oreg.

The I/O interface(s) 204 may couple to one or more I/O devices 206. The I/O device(s) 206 may include user input devices such as one or more of a keyboard, a mouse, a pen, a game controller, a voice input device, a touch input device, gestural input device, the one or more host devices 114, and so forth. The I/O device(s) 206 may include output devices such as one or more of a display, a printer, audio speakers, haptic output device, and so forth. In some embodiments, the I/O device(s) 206 may be physically incorporated with the validation server(s) 108 or be externally placed.

The validation server(s) 108 may also include one or more network interfaces 208 to enable communications between the validation server(s) 108 and other networked devices such as those depicted in FIG. 1. Such network interface(s) 208 may include one or more network interface controllers (NICs) or other types of transceiver devices configured to send and receive communications over the network(s) 102. The validation server(s) 108 may also include one or more busses or other internal communications hardware or software that allow for the transfer of data between the various modules and components of the validation server(s) 108.

As shown in FIG. 2, the validation server(s) 108 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 210 provides storage of computer readable instructions, data structures, program modules, and other data for the operation of the validation server(s) 108.

The memory 210 may include at least one operating system (OS) module 212. The OS module 212 is configured to manage hardware resources such as the I/O interface(s) 204 and provide various services to applications or modules executing on the processor(s) 202.

In some embodiments, the OS 212 may comprise a distribution or variant of the Linux® operating system originally released by Linus Torvalds. In the example shown, the memory 210 includes an application validation module 112 to perform actions for embodiments described herein. In some embodiments, the application validation module 112 includes a validation user interface module 214. The validation user interface module 214 may be configured to provide an application programming interface, graphical user interface (GUI), command-line user interface (CUI), web interface, or other facility to allow the client device 104 to communicate with the application validation module 112. The validation user interface module 214 enables the user 106 to provide input and receive output associated with the host device 114 and the operations of the host device 114. The validation user interface module 214 may accept application(s) for validation, an identification of a host device for validation, and so forth. The validation user interface module 214 may also present object level hierarchy data 120, data related to particular objects or attributes of objects, or application validation result data 122. The validation user interface module 214 is described further with reference to the example interface shown in FIG. 4 below. Operations of the application validation module 112 are described further below with reference to FIGS. 5-12.

Other modules 216 may also be included in the validation server(s) 108. These other modules 216 may include, but are not limited to, user authentication modules, access control modules, billing modules, and so forth.

In some embodiments, the memory 210 also includes a datastore 218 to store information for operations of the validation server(s) 108. The datastore 218 may comprise a database, array, structured list, tree, or other data structure. The datastore 218 may store the object level hierarchy data 120, the application(s) for validation 110 received from the client device(s) 104, the validation result data 122 sent to the client device(s) 104, and the assembly code data 118 received from the host device(s) 114. Other data 220 may also be stored in the datastore 218, such as user account or authentication information, test scripts or other test input data, debugging results, operational audit data, and so forth.

Figure 3:
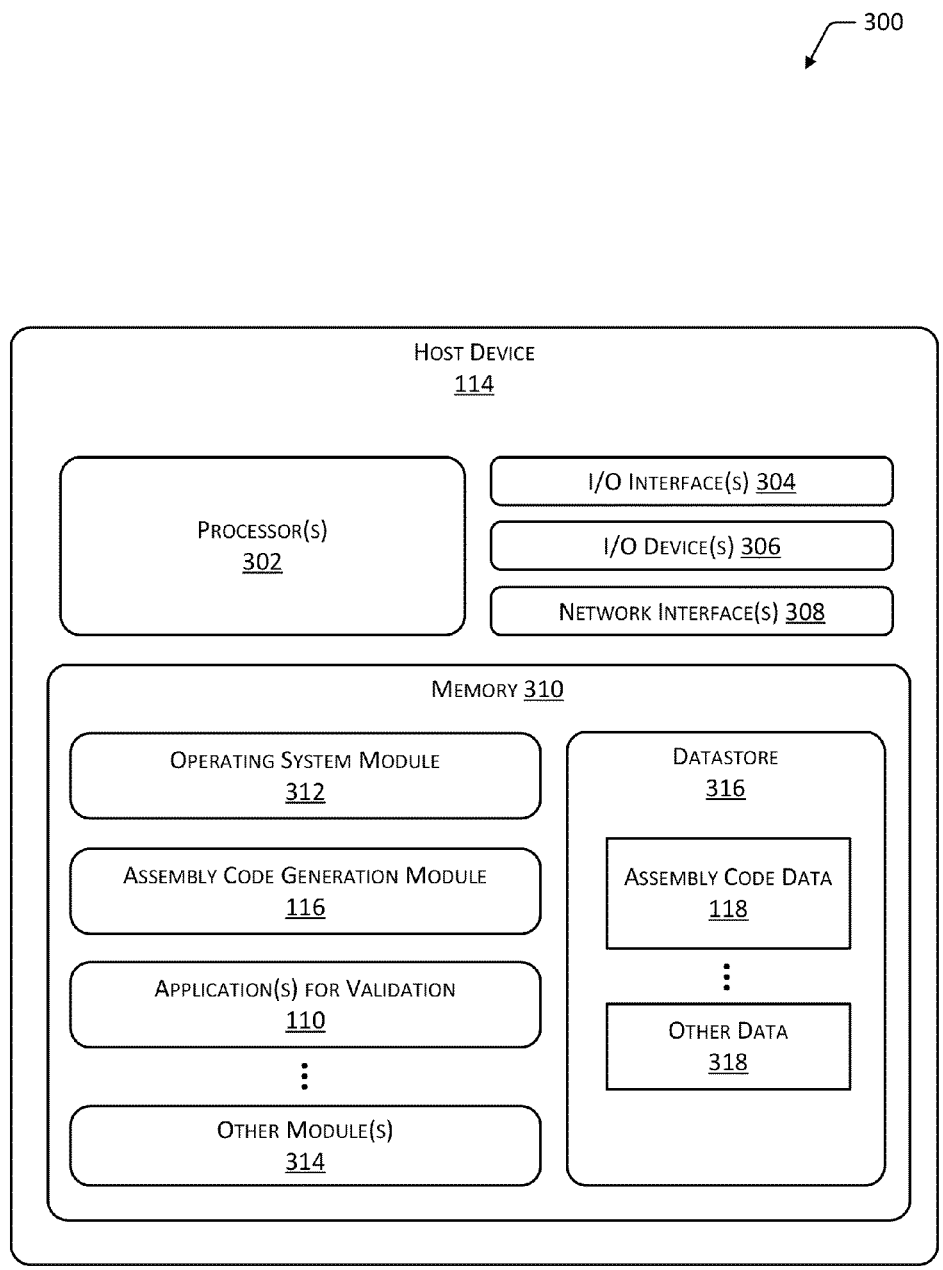
FIG. 3 depicts a block diagram of the host device configured to perform operations for application validation.

FIG. 3 depicts a block diagram 300 of a host device 114 that may be used to implement various embodiments described herein. The host device 114 may include one or more processors 302 configured to execute one or more stored instructions. The processors 302 may comprise one or more cores.

Similar to the validation server(s) 108, the host device 114 may include one or more input/output (I/O) interfaces 304 to allow the host device 114 to communicate with other devices such as those shown in FIG. 1. In some embodiments, the I/O interface(s) 304 may be configured to provide a universal serial bus (USB) connection.

The I/O interface(s) 304 may couple to one or more I/O devices 306. The I/O device(s) 306 may include user input devices such as one or more of a keyboard, a mouse, a pen, a game controller, a voice input device, a touch input device, a gestural input device, one or more accelerometers, one or more gyroscopes, the validation server(s) 108, and so forth. The I/O device(s) 306 may include output devices such as one or more of a display, a printer, audio speakers, haptic output device, and so forth. In some embodiments, the I/O device(s) 306 may be physically incorporated with the host device 114 or be externally placed.

The host device 114 may also include one or more network interfaces 308 configured to send and receive communications over the network(s) 102. The host device 114 may also include one or more busses or other internal communications hardware or software that allow for the transfer of data between the various modules and components of the host device 114.

As shown in FIG. 3, the host device 114 includes one or more memories 310. The memory 310 comprises one or more CRSM, as described above in FIG. 2. The memory 310 may include at least one operating system (OS) module 312. The OS module 312 is configured to manage hardware resources such as the I/O interface(s) 304 and provide various services to applications or modules executing on the processor(s) 302. The OS module 312 may comprise one or more mobile operating systems configured for execution on mobile computing devices. The OS module 312 may implement one or more of iOS™ from Apple® Corp. of Cupertino, Calif.; Windows Mobile® from Microsoft® Corp. of Redmond, Wash.; Android® from Google® Corp. of Mountain View, Calif. and its derivatives from various sources; Palm OS® from Palm Computing® Inc. of Sunnyvale, Calif. and its derivatives from various sources; BlackBerry OS® from Research In Motion® Ltd. of Waterloo, Ontario, Canada; or other operating systems such as VxWorks® from Wind River Systems® of Alameda, Calif. In cases where the OS module 312 implements a version of iOS™, any version of iOS™ may be supported including iOS™ 1.x, 2.x, 3.x, 4.x, 5.x, 6.x, or higher versions, and including any version of iOS™ for the iPhone®, iPad®, iPad Touch®, or any other compatible device. In cases where the OS module 312 implements a version of Android®, any version of Android® may be supported including but not limited to versions 2.3.x "Gingerbread," 4.0.x "Ice Cream Sandwich," 4.1.x "Jelly Bean," and so forth. The memory 310 may include the assembly code generation module 116, the application(s) for validation 110, and other module(s) 314.

The memory 310 also includes a datastore 316 to store information for operations of host device 114. The datastore 316 may comprise a database, array, structured list, tree, or other data structure. The datastore 316 may store the assembly code data 118 generated by the assembly code generation module 116. Other data 318 may also be stored, such as user account information, network connectivity data, and so forth.

Illustrative User Interface

Figure 4:
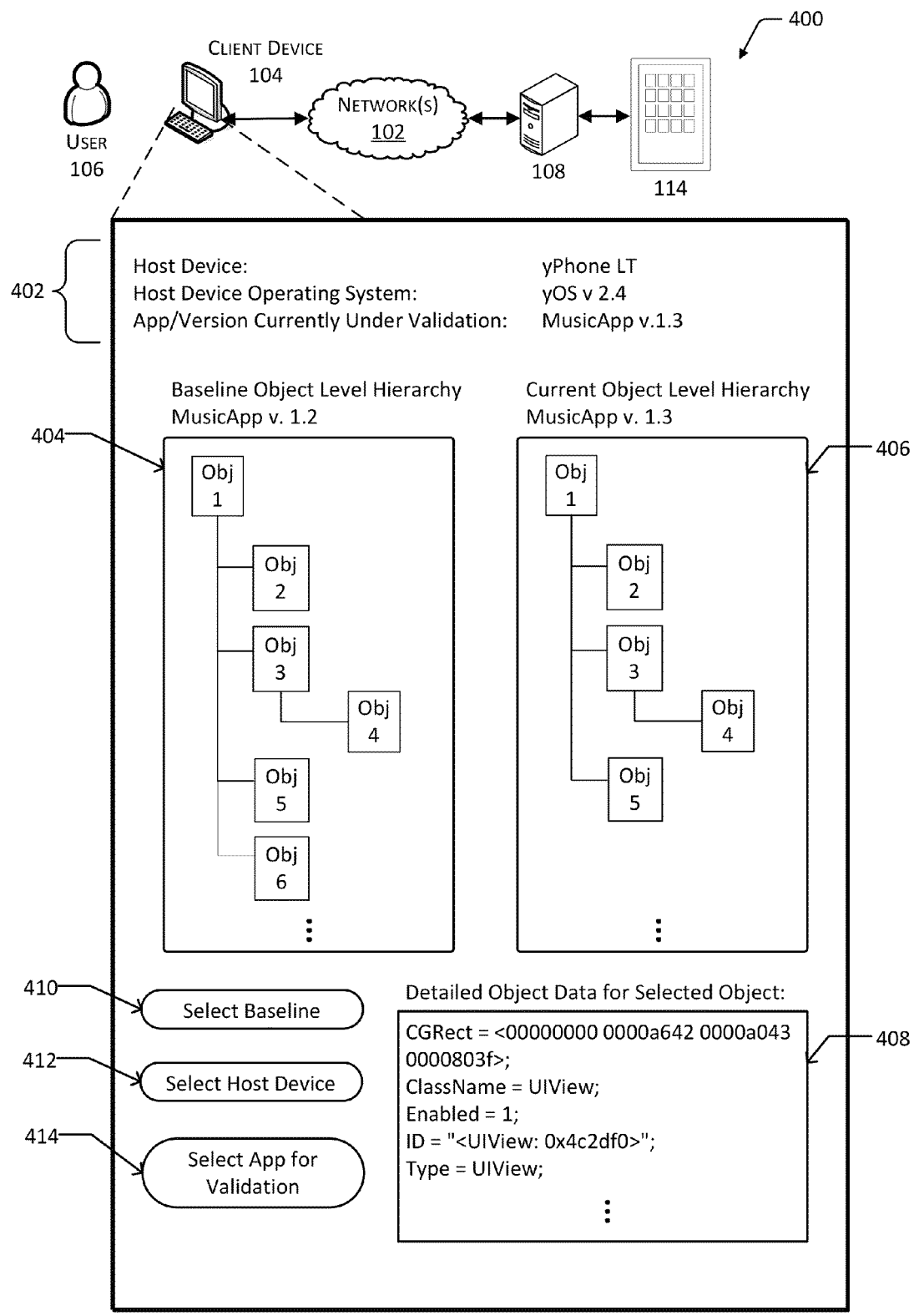
FIG. 4 depicts a user interface to manage application validation as described herein.

FIG. 4 depicts an example user interface 400 for the validation user interface module 214 of the application validation module 112. In some embodiments, the interface 400 comprises a web interface suitable for viewing within a web browser running on a client device 104 of a user 106. In some implementations, the data provided by the interface 400 may be copied into a file and provided to a user 106 in the file, in an email, or through other means. For example, the object level hierarchy data 120, the validation result data 122, or both may be provided to the client device 104 using the network 102.

The interface 400 may include a summary section 402, describing characteristics of the host device 114 or other aspects of the remote control test environment. For example, as shown in FIG. 4, the summary section 402 may include information for a device type of the host device 114, an OS and OS version for the OS running on the host device, one or more particular apps or other processes currently executing on the host device (e.g., apps under validation), and so forth.

In some embodiments, the interface 400 may include a graphical depiction or other description of a baseline object level hierarchy 404, and a graphical depiction or other description of a current object level hierarchy 406. The current hierarchy 406 may be the object level hierarchy associated with a current version of an application for validation, and the current hierarchy 406 may be compared to the baseline hierarchy 404 previously generated for a previous version of the application. In some embodiments, the baseline hierarchy 404 and the current hierarchy 406 may include a tree structure showing the parent-child relationships between various objects associated with the application in its baseline and current versions respectively.

In some embodiments, differences between the two object level hierarchies may be highlighted, differently colored, or otherwise indicated, to highlight potential problems, bugs, or regressions in the application. As used herein, a regression includes a change in a software program from one version to another version. In some cases, such regressions may be identified as bugs introduced during the development of the application.

In some embodiments, the interface 400 may include a detail description 408 to show a more detailed description of an object selected by the user (e.g., one of the objects shown in the hierarchies 404 or 406). The detailed description 408 may include a portion of assembly code data associated with the selected object, attribute/value pairs, address data, parent or child object information, or other debug information for the object.

In some embodiments, the interface 400 may include one or more controls 410 that enable a user to select a baseline version of the application for comparison. Such control(s) 410 may display a list of available baseline versions based on the object level hierarchy data 120 stored on the validation server(s) 108. The interface 400 may also include one or more controls 412 that enable a user to select a host device and host device operating system on which to generate assembly code data for object level hierarchy generation. Such control(s) 412 may display a list of host devices and host device operating systems available for validation operations. In some embodiments, the interface 400 may include one or more controls 414 to enable a user to select and upload an application for validation from the user's client device to the validation server(s) 108.

Although FIG. 4 shows an example interface with various user interface elements in particular positions, the particular example arrangement shown is not in any way limiting of embodiments. Accordingly, various embodiments may employ a user interface that includes more or fewer user interface elements or controls, in any combination and in any arrangement to enable functionality of the embodiments. Further, embodiments may support multiple user interfaces (e.g., multi-page web sites) with functionality spread across various pages. Embodiments may also support dynamically generated interfaces, where the particular user interface elements displayed and the location or duration of their display is based on a particular state of the system, particular characteristics of the user or the local client device, or other factors.

Illustrative Processes

Figure 5:
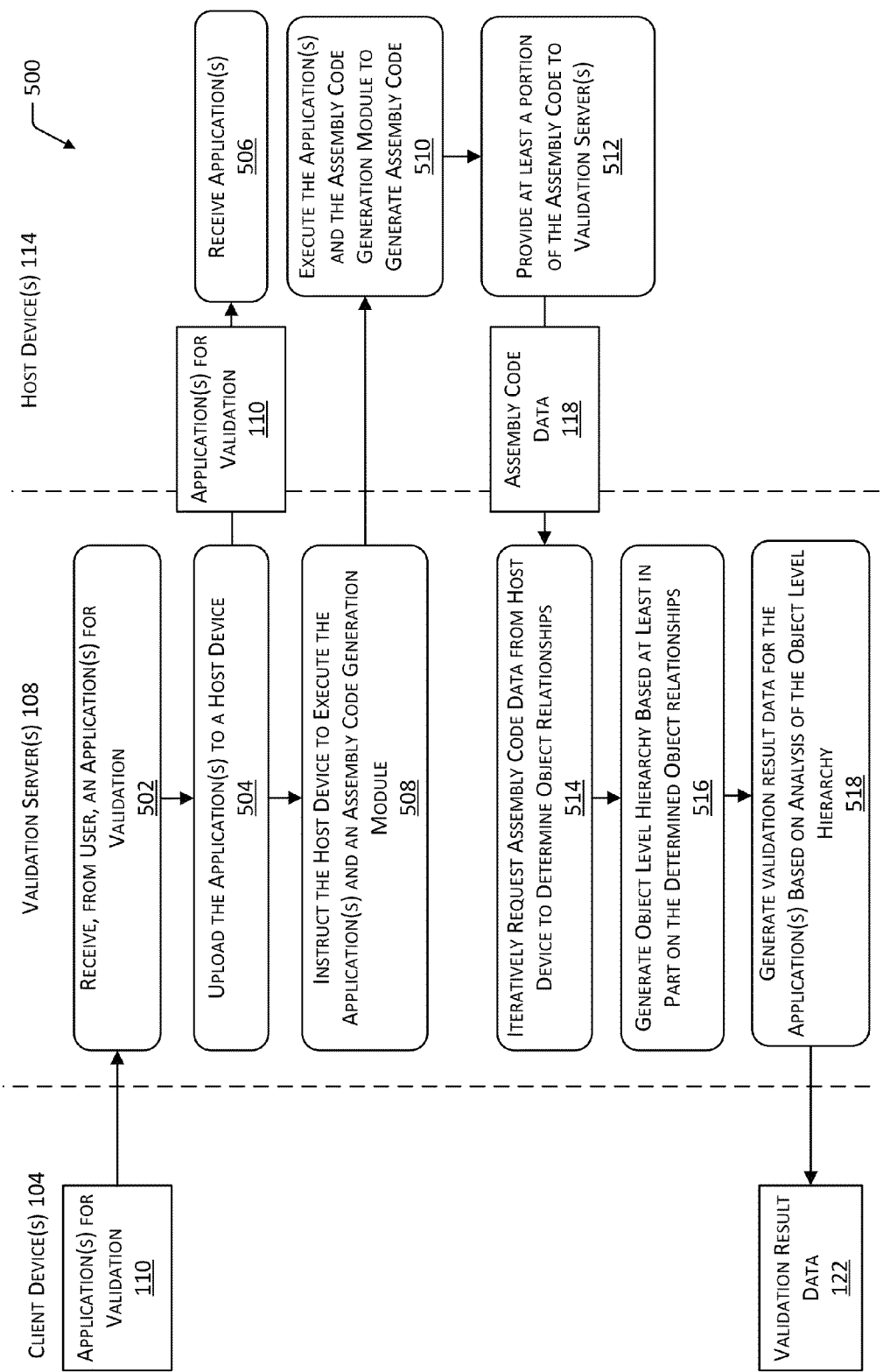
FIG. 5 depicts a flow diagram of a process for providing application(s) for validation to a host device and receiving assembly code data from the host device, which may be used to validate the application(s).

FIG. 5 depicts a flow diagram 500 of an example process for application validation, according to embodiments described in this disclosure. As shown in FIG. 5, the process includes operations performed on the validation server(s) 108 and operations performed on the host device(s) 114. In some embodiments, the operations performed on the validation server(s) 108 may be performed at least in part by the application validation module 112 or its sub-modules, and the operations performed on the host device(s) 114 may be performed at least in part by the assembly code generation module 116, or other modules of the host device(s) 114. As described above, in some embodiments the host device 114 may be emulated, and the functions provided by the assembly code generation module 116 may be included in the emulation.

In the example shown in FIG. 5, at 502 the validation server(s) 108 may receive one or more applications for validation 110. For example, the user 106 may upload the application for validation 110 through the user interface presented on a client device 104. This user interface may be provided by the validation user interface module 214. At 504, the application(s) for validation 110 may be uploaded to a host device 114 specified by the user 106 for application validation. At 506, the application(s) for validation 110 are received by the host device 114. In some embodiments, uploading of the application(s) for validation 110 may also include operations to install the application(s) on the host device including file or folder creation, creating or modifying registry or configuration settings, creating GUI elements (e.g., icons), and so forth.

At 508, the validation server(s) 108 may instruct the host device 114 to execute the application(s) for validation 110, and to execute an assembly code generation module to generate assembly code data associated with the application. At 510, the application(s) and the assembly code generation module are executed on the host device 114. As described further herein with regard to FIGS. 7 and 8, the assembly code generation module 116 may operate to generate the assembly code data 118 associated with the executing application(s) for validation 110. In some embodiments, the assembly code data 118 may be stored locally on the host device 114 and retrieved by the validation server(s) 108 as described with regard to FIG. 6. At 512, at least a portion of the assembly code data 118 is provided to the validation server(s) 108.

At 514, the validation server(s) 108 request or otherwise retrieve the assembly code data 118 from the host device 114, to determine relationships between the objects described in the assembly code data 118. In some embodiments, this operation may include a series of iterated operations to retrieve object-related data from the host device 114. This iterative process is described further with regard to FIG. 6. In some embodiments, the relationships determined are parent-child or other forms of inter-entity relationships such as "has-a" relationship between objects. At 516, an object level hierarchy is generated based at least in part on the determined relationships for the objects associated with the application(s) for validation 110. In some implementations, the object level hierarchy data 120 based on the generated object level hierarchy may be provided to the client device 104 for further processing or analysis.

At 518, an analysis of the object level hierarchy may be performed to validate the application and to generate the validation result data 122. Examples of such validation are described further with reference to FIGS. 10-12, and may include comparison of a current object level hierarchy to a previously generated object level hierarchy (e.g., for regression testing of an application), or analysis of text attributes of objects in the object level hierarchy, to verify a localization of the application. The validation result data 122 may be reported to the user 106 through the user interface provided by the validation user interface module 214 or through other modes of communication such as email, text messaging, file transfer over a network, and so forth. In some embodiments, the validation result data 122 may be stored on the validation server(s) 108 or elsewhere, and made available to a requesting user or process.

Figure 6:
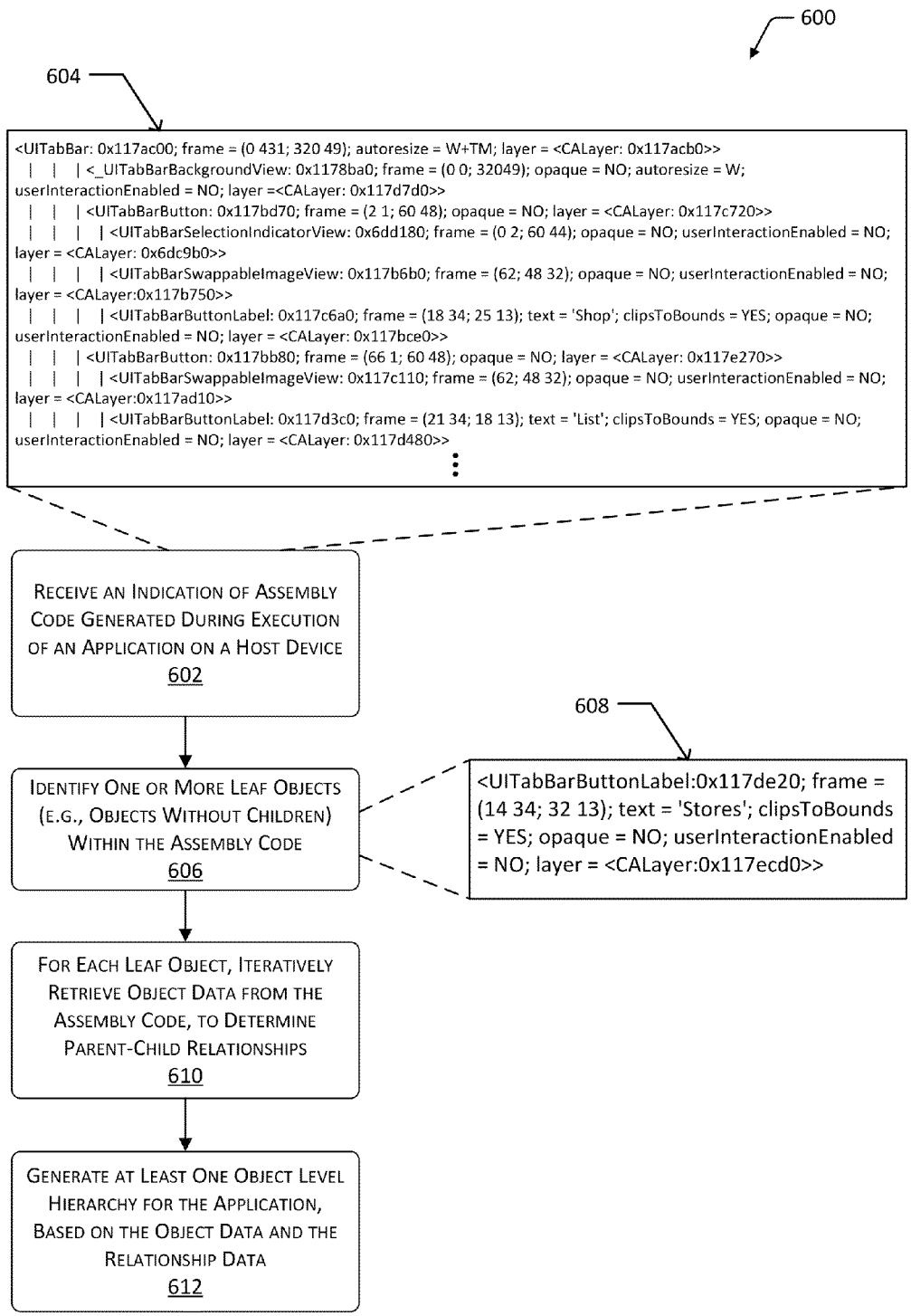
FIG. 6 depicts a flow diagram of a process for analyzing assembly code data to generate at least one object level hierarchy for an application.

FIG. 6 depicts a flow diagram 600 of a process for determining one or more object level hierarchies for objects associated with an application, based on assembly code data 118 generated on the host device 114. This process may be implemented by the validation server(s) 108, the host device(s) 114, the client device(s) 104, or any combination thereof.

At 602, an indication is received of assembly code that has been generated during execution of an application on the host device 114. In some embodiments, the indication is received at the validation server 108 that assembly code has been generated as output from the assembly code generation module 116 executing on the host device 114 and attached to the application for validation 110. Generation of assembly code data 118 is described further is reference to FIG. 7. In some embodiments, the assembly code is stored on the host device 114 and portions of the assembly code are iteratively transferred to the validation server 108 by the application validation module 112 executing on the validation server 108. FIG. 6 shows an example portion 604 of assembly code data 118 that may be generated by the assembly code generation module 116 executing on the host device 114.

At 606, one or more leaf objects are identified within the assembly code data 118. In some embodiments, identification of leaf objects is performed on the validation server 108, based on assembly code data 118 transferred to the validation server 108 from the host device 114. As used herein, leaf objects describe those objects that do not include child objects. In some embodiments, leaf objects are identified based on a determination that their members include certain attributes, such as text attributes and image attributes, and certain types of controls such as button controls, but do not include other types of attributes or controls. Leaf attributes may be identified based on requests from the validation server 108 to the host device 114, requesting information for objects in the assembly code data. Remote control commands may be sent from the validation server 108 to the host device 114, to perform a search for predetermined patterns within the assembly code data 118.

In some embodiments, the search to identify objects includes a text-based search for predetermined text patterns within the assembly code data 118. Such a text-based search may identify predetermined patterns within the assembly code data 118, patterns that correspond to objects. Text-based searching may be used to identify those objects that include a set of attributes that correspond to a leaf object, such as attributes for button control(s), text attribute(s), and image attribute(s). For example, given the example portion 604 of assembly code data shown in FIG. 6, embodiments may identify the "UITabBarButtonLabel" object 608 as a leaf object given its particular attributes.

At 610, for each identified leaf object, object data is retrieved to identify ancestor objects for the leaf object. Ancestor objects may include a parent object, grandparent object, and so forth up a parent-child dependency chain starting from the leaf object at the lowest level. In some embodiments, identification of ancestor objects is based on address data within the assembly code. In some embodiments, the address data describes addresses for locations in virtual memory on the host device. Address data may also describe addresses for locations in active memory or program memory on the host device.

For example, a leaf object may be described in a particular portion of the assembly code data, and that description may include an address for the leaf object's parent object. Then, the assembly code data describing that parent object may be analyzed to determine an address for its parent, and so forth. This analysis may be performed through iterative requests for assembly code data, from the validation server 108 to the host device 114, until a top-level object is identified (e.g., an object that does not have a parent). In some cases, where the assembly code data is associated with UI elements of the application, the top-level object may be the address of a user interface application view (e.g., the UIApplication object in some assembly languages).

At 612, at least one object level hierarchy may be generated for the application, based on the object data and the relationship data. In some embodiments, the object level hierarchy data 120 may be stored as a tree data structure or in some other data format, on the validation server 108 or elsewhere. In some embodiments, each object level hierarchy may be associated with a particular type of object, such as UI objects, memory management objects, and the like. In such cases, multiple object level hierarchies may be generated and stored, each hierarchy corresponding to an object type. An object may refer to a location in memory that may be referenced by an identifier and that may include one or more data structures, variables, functions, and so forth.

As used herein, objects may refer to program objects within an application. For example, in cases where the application for validation is written in the Java™ programming language or another object-oriented programming language, the objects may correspond to classes defined in the application source code, objects that are instantiations of classes at runtime, or both. Embodiments support the generation and use of assembly code data to validate applications written, entirely or in part, in an object-oriented programming language such as Java™, C++, C#, Python™, Smalltalk, Objective-C® or other languages. Embodiments may also support validation of applications written in languages that include objects or similar constructs as features of the language, but with a grammar or syntax that varies from those of other object-oriented programming languages. For example, embodiments may provide for the validation of applications written in multi-paradigm programming languages that combine aspects of two or more of procedural, functional, and object-oriented paradigms, such as Lisp or Common Lisp. As used herein, an object may refer to a construct within a computer program, where the construct includes a combination of dynamic data elements, static data elements, methods, procedures, functions, or other elements.

Although some of the examples provided herein describe using an object level hierarchy to validate an application written in the Java™ programming language, embodiments may also operate to validate an application written in the Objective-C® Objective-C++, or Objective-C® 2.0 programming language. For example, embodiments may support validation of Objective-C® applications with GUIs written using the Cocoa® application programming interface (API) from Apple® Corp. of Cupertino, Calif. In such cases, embodiments may extract from the assembly code data 118 information for one or more objects that correspond to windows defined in the Objective-C® application. In some embodiments, data from one or more Nib files associated with the application may be employed to identify objects associated with the application, and relationships between the objects. Such a Nib file may be loaded automatically when the application is launched on the host device 114, and may include data identifying user interface objects and relationships between the objects.

In cases where the object level hierarchy includes UI objects associated with the application, the object level hierarchy generated may be relative to a super view which is a parent of the current view for the application. In such cases, embodiments may include a step to convert the view's frame coordinates to screen coordinates for one or more objects in the object level hierarchy. For example, in the example assembly code data listed in 604, the leaf object 608 is a view object relative to a super view. This object has coordinates relative to the super view, "frame=(14 34; 32 13)." Embodiments may include a conversion step to convert these relative coordinates to coordinates relative to the screen or display, e.g., absolute coordinates. In this case, absolute coordinates may be x=158 and y=500.

In some embodiments, the operations described with regard to FIG. 6 may be performed via remote control operations. For example, the validation server 108 may remotely control the host device 114 to install and execute the application for validation 110, execute the assembly code generation module 116, and so forth. Such remote control operations may be performed using methods or systems described in U.S. patent application Ser. No. 13/619,867, filed on Sep. 14, 2012, titled "Remote Control of a Mobile Device," which is incorporated by reference above.

Figure 7:
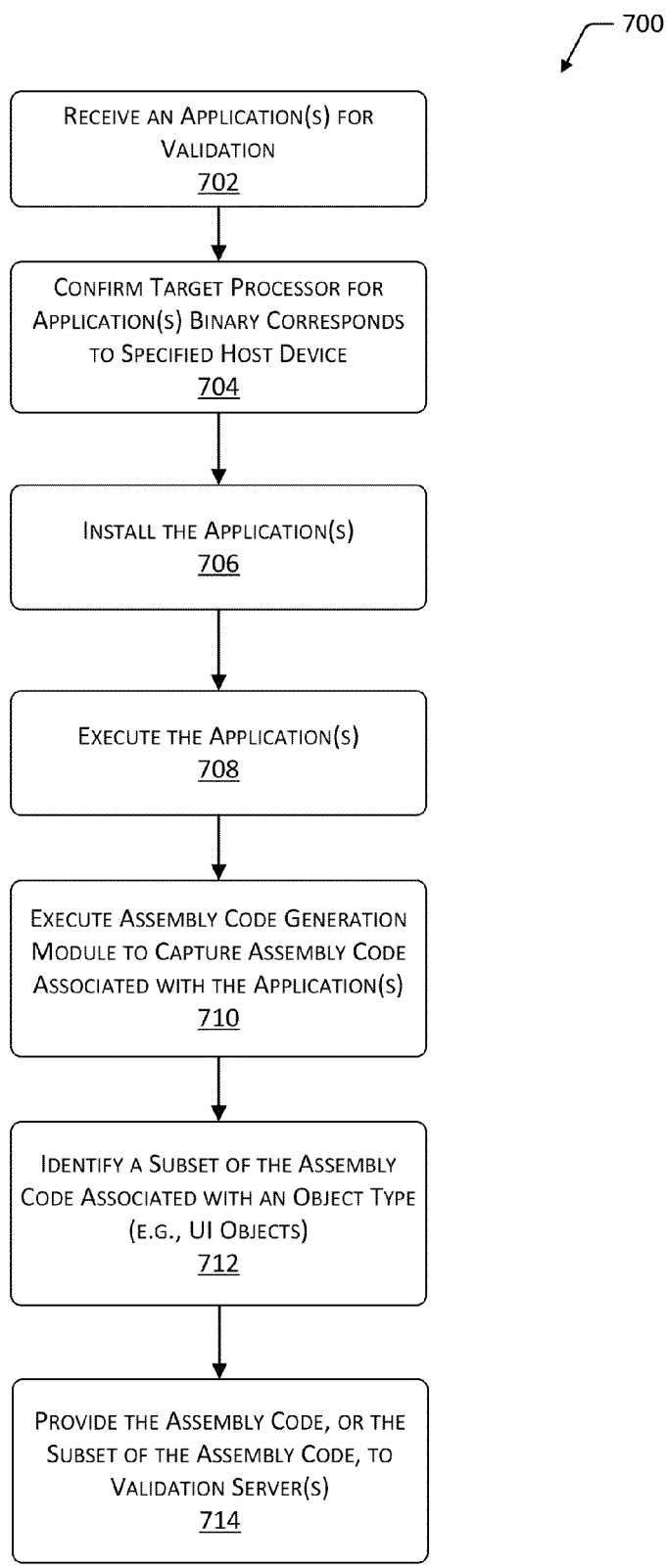
FIG. 7 depicts a flow diagram of a process for generating assembly code data, and providing assembly code data to validate one or more applications.

FIG. 7 depicts a flow diagram 700 of a process for generating and providing assembly code data for an application. This process may be implemented by the host device 114, the validation server 108, the client device 104, or a combination thereof. In some embodiments, the process may be performed on the host device 114 via remote control instructions received from the validation server 108, as discussed above.

At 702, one or more applications for validation 110 are received at the host device 114, from the validation server 108. In some cases, the application(s) are in the form of executable binaries that have been previously generated from source code by a compiler designed to generate binary executables for the processor 302 of the host device 114. In some cases, the application(s) are program(s) written in the Java™ or C#programming languages, or other interpreted languages or scripting languages. In such cases, the application(s) may be received in the form of intermediate language files that are executable by a virtual machine or other runtime process executing on the host device.

At 704, a check is performed to confirm that the target processor for each application binary corresponds to the processor 302 of the host device 114. For example, where the host device 114 includes a processor or core that conforms to a version of the Advanced RISC Machine (ARM) architecture of ARM Holdings® of Cambridge, United Kingdom, or that supports an ARM, THUMB, or THUMB-2 instruction set for such processors, each application binary received by the host device 114 may be examined to verify that the binary targets that architecture or instruction set. In some cases, this check may be performed by examining a first section of the binary which includes a description of the target architecture or instruction set. This check may be performed at the validation server 108 when the application(s) are received from the client device 104, or at the host device 114 when the application(s) are received from the validation server 108.

At 706, the application(s) may be installed on the host device 114 having a processor architecture compatible with the application. For example, installation may proceed when the binary for the application corresponds to the host device's 114 processor architecture. Such installation may include creation or modification of files, folders, registry data, and so forth. At 708, the application(s) may be executed. At 710, the assembly code generation module 116 may be executed on the host device 114, to capture or otherwise generate assembly code data associated with the executing application(s). In some embodiments, the assembly code generation module 116 includes at least a portion of a debugger such as the GNU debugger (gdb), and the debugger may be executed with reference to a process identifier for the application to attach the debugger to the application. In some cases, the assembly code generation may monitor or intercept calls made from the application out to virtual memory, and thus generate assembly code data for objects associated with the executing application. In some embodiments, where the application for validation 110 at least partly executes within a virtual machine (VM) on the host device 114, the application for validation 110 and the assembly code generation module 116 may both execute within the same VM on the host device 114. Alternatively, the assembly code generation module 116 may be omitted when the virtual machine or an emulator is configured to provide the assembly code.

At 712, in some embodiments a subset of the assembly code data is identified to be provided to the validation server 108. The subset of the assembly code data may be that portion of the assembly code that is relevant to a particular type of object, feature set, or other aspect of the application. For example, a subset of assembly code may be identified that is associated with UI objects within the application. As another example, a subset of assembly code may be identified that is associated with memory management objects within the application. In some embodiments, the subset may be determined by searching the assembly code for object data that corresponds to a known textual pattern for objects of a particular type, such as objects that follow a particular naming convention. For example, "UI*", where "*" (asterisk) is a wildcard for one or more other characters of any type. Corresponding objects and their child objects may then be extracted from the assembly code and provided as a subset to the validation server 108.

At 714, the assembly code or the identified subset of the assembly code is provided to the validation server 108. As described above, the assembly code may be provided in response to a set of iterated requests made by the validation server 108. The iterated requests and the associated assembly code provided in response may be used to build the object level hierarchy.

Figure 8:
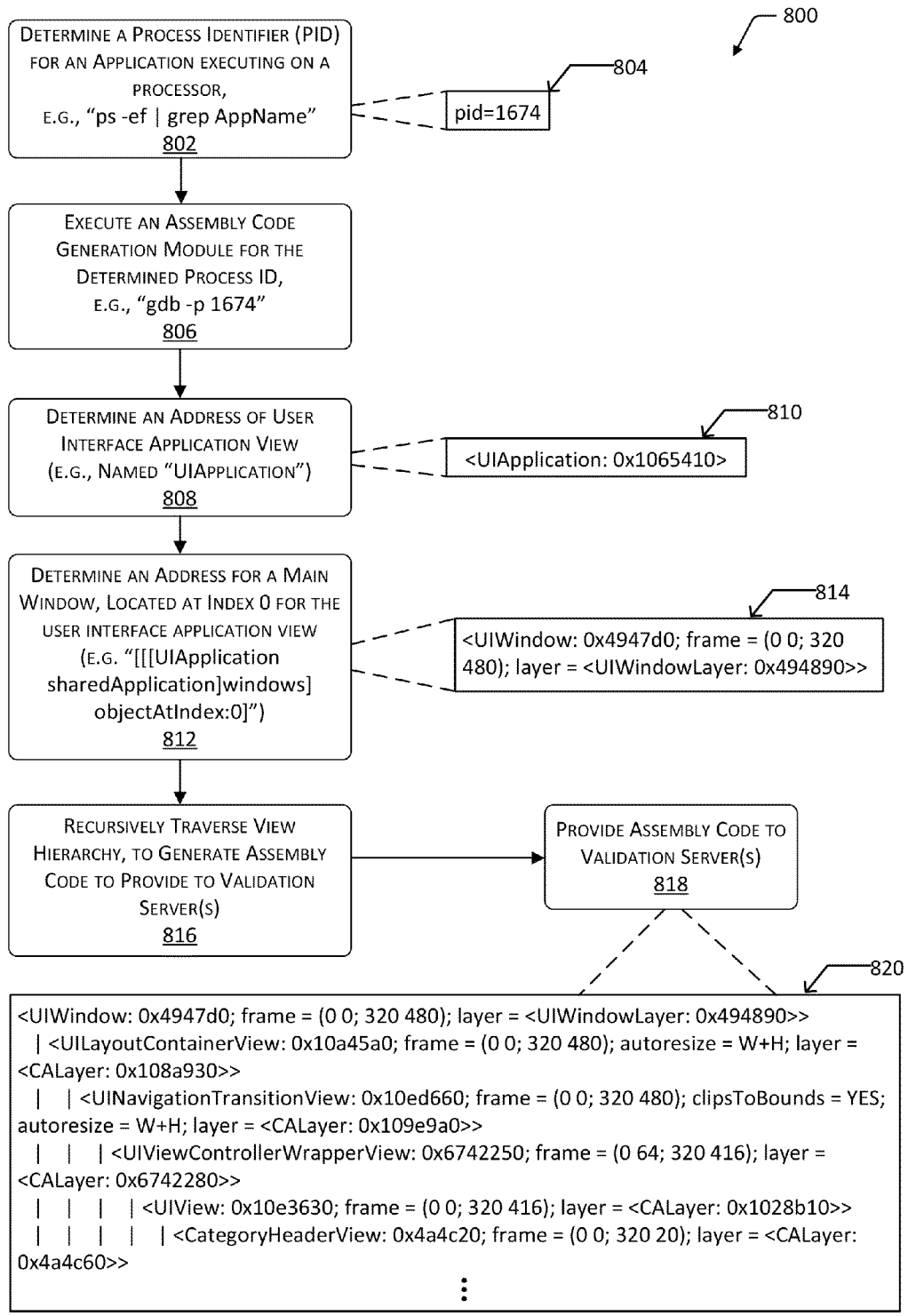
FIG. 8 depicts a flow diagram of a process for generating assembly code data, and providing assembly code data to validate one or more applications, including example output data.

FIG. 8 depicts a flow diagram of a process 800 for generating and providing assembly code data 118 for an application. This process may be implemented by the host device 114, the validation server 108, or a combination thereof. As with the process of FIG. 7, the operations of the process of FIG. 8 may be performed on the host device 114 via remote control instructions received from the validation server 108, as discussed above. While FIG. 8 depicts an example process for UI objects of the application, assembly code data 118 may be provided for other types of objects such as objects related to memory management, security, or other features of the application.

At 802, a process identifier (PID) may be determined for an application for validation 110 which is executing on a processor of the host device 114. In some cases, the host device 114 may run a command line interface (e.g., csh, bash, ksh, etc.) configured to accept commands. In such cases, the PID may be determined by executing a command to list currently executing processes (e.g., "ps-ef") and searching the list for a known application (e.g., "AppName"). Such a command may be formed as "ps-ef|grep AppName." The output of such a command may be examined to determine the PID 804.

At 806, the assembly code generation module may be executed with reference to the determined PID. For example, where the assembly code generation module 116 is the GNU debugger (gdb), the command to launch the assembly code generation module 116 may be "gdb-p 1674." Such a command may launch the debugger to attach to the executing application for validation 110, enabling the debugger to generate assembly code for the application for validation 110.

At 808, an address of a user interface application view is determined based on the assembly code data. In cases where the application is a Java™ program, the user interface application view may be identified as "UIApplication." In some cases, the user interface application view may be a top-level object for the UI of the application, such that other UI objects of the application are descendants of the user interface application view (e.g., children, grandchildren, and so forth). In some embodiments, a command is sent to the assembly code generation module 116 to request the address 810 of "UIApplication."

At 812, an address may be determined for a main window of the application. For example, this may be the virtual memory address associated with the main window of the application. In some cases, the main window may be identified as the object located at index 0 for the user interface application view. In some embodiments, a command is sent to the assembly code generation module 116 to request the address 814 of the main window.

At 816, an iterative series of requests may be received from the validation server 108 to determine parent-child relationships between objects as described above. Such requests may comprise a recursive traversal of a hierarchy of objects associated with the application. For example, requests may comprise a recursive traversal of a view hierarchy for the UI of the application. The assembly code related to the requested object data may be provided to the validation server 108 at 818. A portion of an example object level hierarchy is shown at 820. As shown, an object "UIWindow" includes a child object "UILayoutContainerView" which includes a child object "UIViewControllerWrapperView", and so forth.

In cases where the application for validation 110 is a native application that has been compiled to execute on the particular processor architecture of the host device 114, a top-level view or the main window view for an application may be a UIView object. In other cases where the application executes within a rendering engine, such as where the application for validation 110 conforms to the HTML 5 (or higher) standard, the top-level view may be a UIBrowserView object.

FIG. 9 depicts another portion of an example object level hierarchy 900 that may be generated by embodiments described in this disclosure. As shown, the hierarchy 900 may include any number of objects that each may be a parent or a child of one or more other objects. For example, the hierarchy 900 includes a "CGRect" object 902, which contains three other "CGRect" objects 904, 906, and 908. In the example shown, the objects 904, 906, and 908 may be considered as leaf objects given that each of these objects does not include other child objects. In this example, the objects 904, 906, and 908 include a set of attributes such as "ClassName", "Enabled", "ID", and "Type". Each attribute includes a name/value pair. For example, the object 904 includes an attribute with name "ID" and value "TOP STORIES".

Figure 10:
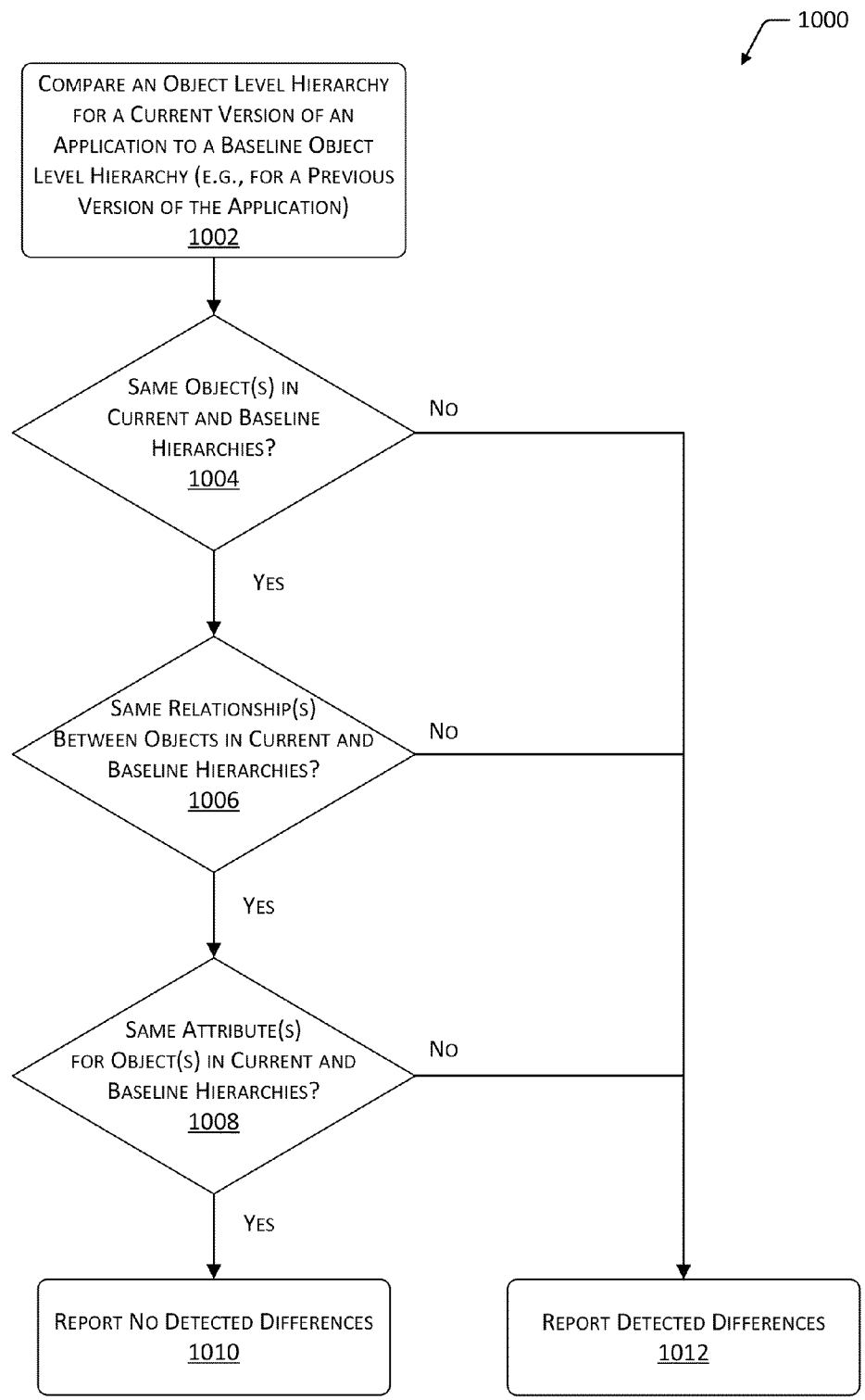
FIG. 10 depicts a flow diagram of a process for validating an application by analyzing an object level hierarchy generated for the application.

FIG. 10 depicts a flow diagram 1000 of a process for validating an application based on an object level hierarchy for the application. In some embodiments, the object level hierarchy may be generated as described above, based on assembly code data 118 describing objects associated with the application for validation 110. The process may be implemented by the host device 114, the validation server 108, the client device 104, or a combination thereof.

At 1002, a first object level hierarchy is compared to a second object level hierarchy. In some embodiments, the first object level hierarchy is an object level hierarchy generated based on a current version of the application under validation 110, and the second object level hierarchy is previously generated based on a previous version of the application. In such cases, the second object level hierarchy may be considered a baseline hierarchy, and comparison of the current hierarchy to this baseline enables the identification of potential regressions (e.g., bugs) in the current version of the application under validation 110. In some embodiments, the first and second hierarchies are stored as part of the object level hierarchy data 120 on the validation server(s) 108.

Embodiments support the comparison of various aspects of the two hierarchies, to identify potential regressions. At 1004, a determination is made whether the set of objects in the first hierarchy corresponds (e.g., is the same as) the set of objects in the second hierarchy. At 1006, a determination is made whether the relationships (e.g., parent-child relationships) between the objects of the first hierarchy correspond to the relationships between the objects of the second hierarchy. At 1008, a determination is made whether attribute(s) for the objects of the first hierarchy correspond to the attribute(s) for the objects of the second hierarchy.

In cases where the determinations at 1004, 1006, and 1008 are positive indicating a correspondence in the objects, relationships, and attributes, at 1010 a report may be made that indicates no detected differences between the first and second hierarchies. In cases where one or more of the determinations at 1004, 1006, and 1008 are negative indicating at least one difference in the objects, relationships, or attributes, the detected differences between the two hierarchies may be reported at 1012. In either case, information describing the differences or lack of differences may comprise the validation result data 122, and may be reported to the user 106 through the validation user interface module 214. In some embodiments, the validation result data 122 may be stored on validation server 108 and provided to a user or process in response to a request for the data.

Figure 11:
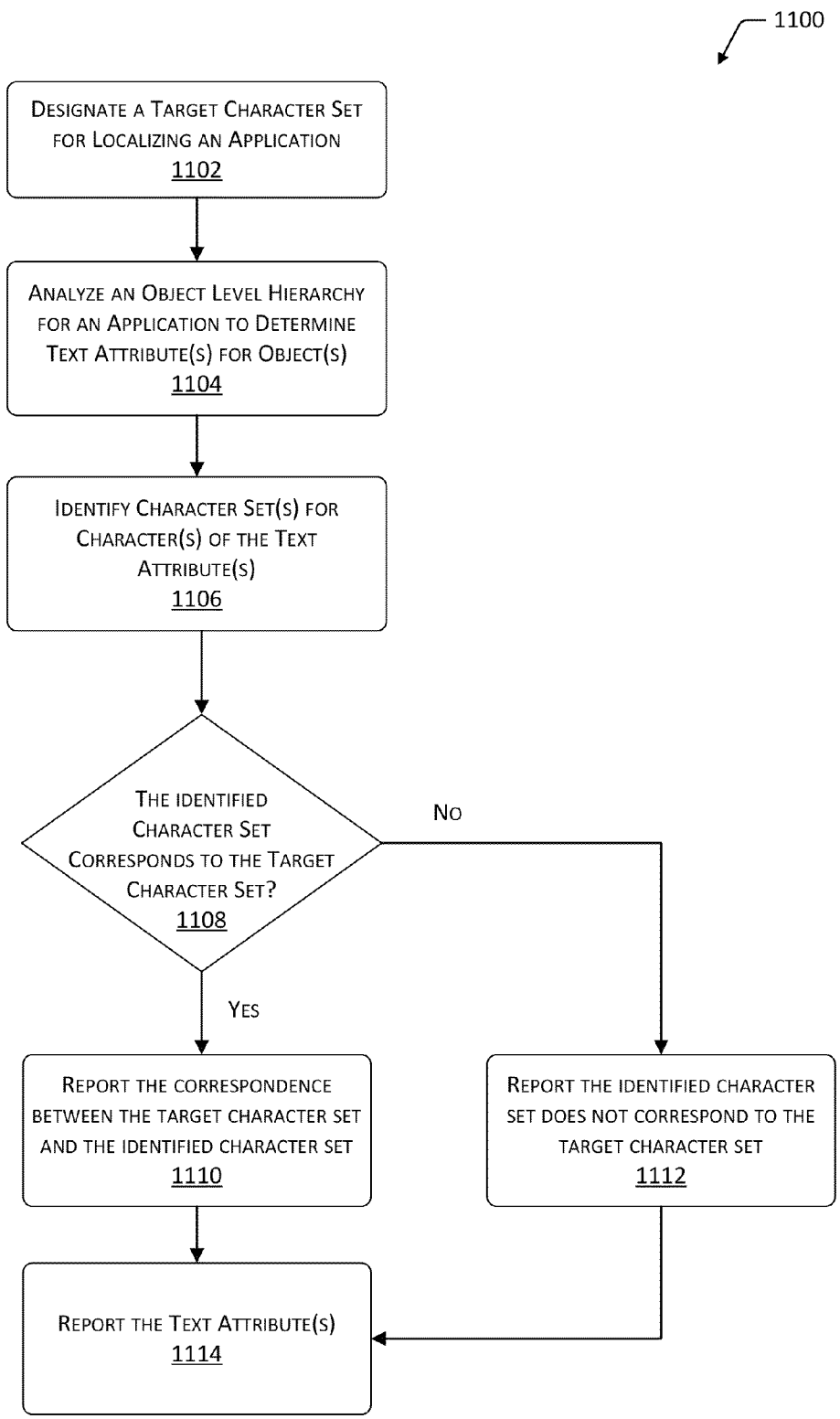
FIG. 11 depicts a flow diagram of a process for validating a localization of an application by analyzing an object level hierarchy generated for the application.

FIG. 11 depicts a flow diagram 1100 of a process for validating an application based on an object level hierarchy for the application, to verify a localization of the application. In some embodiments, the object level hierarchy may be generated as described above, based on assembly code data describing objects associated with the application for validation. The process may be implemented by the host device 114, the validation server 108, the client device 104, or a combination thereof.

At 1102, a target character set may be designated for the application under validation. In some cases, the target character set may be identified by a user as a desired character set for localization of the application, and the validation may determine whether the application has been correctly localized to the desired character set. At 1104, an object level hierarchy for the application may be analyzed to determine one or more text attributes included in objects associated with the application. In some embodiments, this step includes searching the object level hierarchy for attributes that have a text value, such as "ID='TOP STORIES'" in the object 904 of FIG. 9. In some embodiments, the identified text attributes are stored in a list or other data structure to be reported as part of the validation result data 122.

At 1106, one or more character sets are identified for the various characters of the text attributes determined at 1104. At 1108, a determination is made whether the identified character set(s) correspond to the target character set. If so, then at 1110 a positive correspondence between the target character set and the identified character set(s) is reported. If not, then at 1112 a negative correspondence between the target character set and the identified character set(s) is reported. At 1114, the text attribute(s) may be reported as well, along with an identification of those text attribute(s) that do not correspond to the target character set or those text attribute(s) that correspond to the target character set. The text attribute data, along with the result of whether the text attributes correspond to the target character set, may comprise the validation result data 122, and may be reported to a user 106 through the validation user interface module 214. In some embodiments, the validation result data 122 may be stored on the validation server 108 and provided to a user or process in response to a request for the data.

Figure 12:
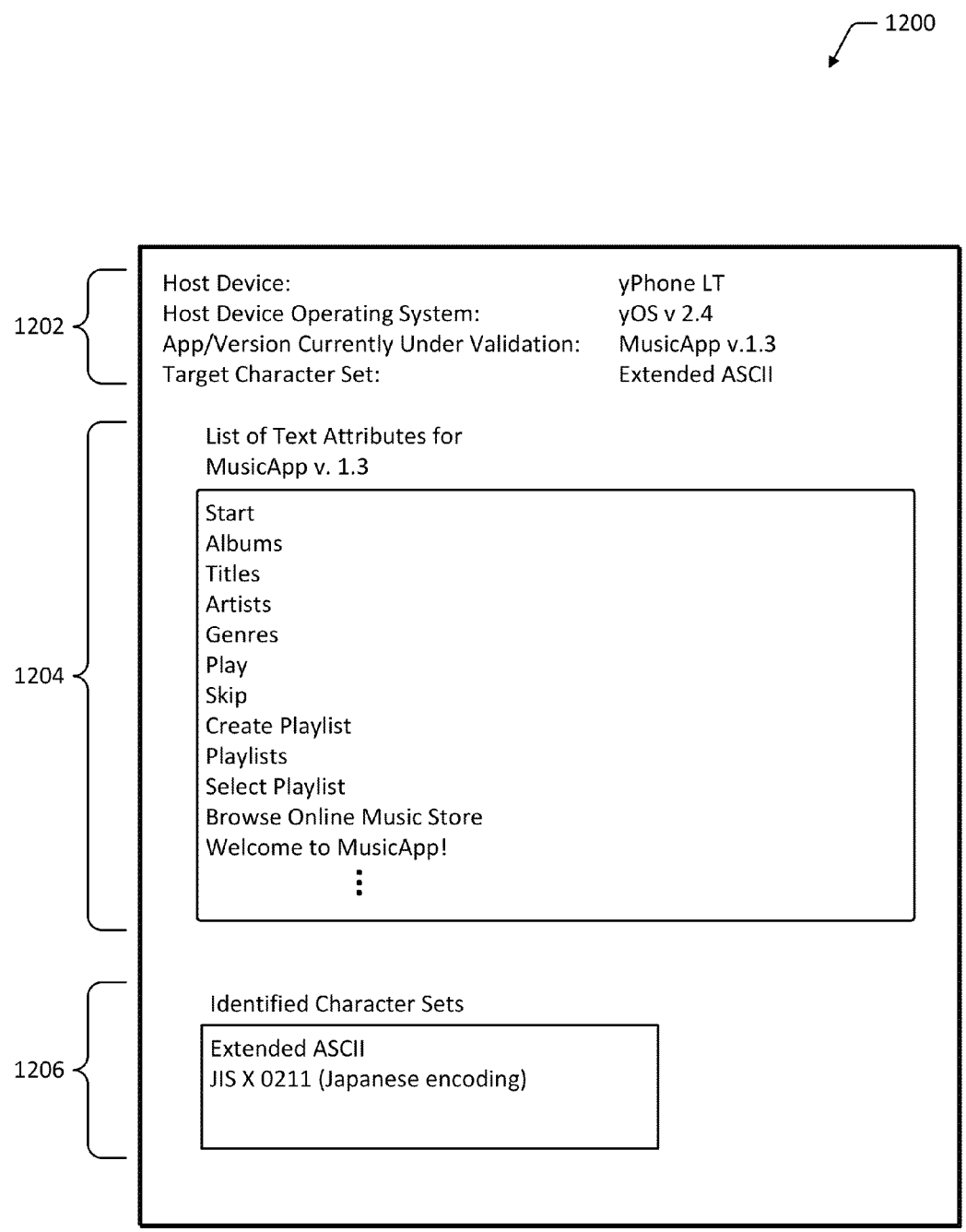
FIG. 12 depicts an example report listing text attributes from an object level hierarchy for an application, and providing information for character set(s) corresponding to the text attributes.

FIG. 12 shows an example report 1200, reporting results of the validation of an application for correct localization, as described with regard to FIG. 11. In some embodiments, the report 1200 may be provided through the validation user interface module 214 or through a separate interface or communication.

The report 1200 may include a summary section 1202, describing characteristics of the host device 114 or other aspects of the remote control test environment. For example, as shown in FIG. 12, the summary section 1202 may include information for a device type of the host device 114, an OS and OS version for the OS running on the host device, one or more particular apps or other processes currently executing on the host device 114 (e.g., apps under validation), and so forth. The summary section 1202 may also include information for a target character set, e.g., the character set into which the application is to be localized.

The report 1200 may also include a list of text attributes 1204, listing all the text data identified from the object level hierarchy for the application. The list 1204 may be a scrollable list, allowing a user to view all the text. Other data structures or UI controls may be employed by embodiments to display the text data. The report 1200 may also include a list of identified character sets 1206 for the text attributes. In some embodiments, identified character sets that differ from the target character set may be highlighted or otherwise indicated to the user. In some cases, the list 1204 may also provide an indication of text data that does not correspond to the target character sets, indicating a potential error in localization for the application.

The user 106 may use the data presented in the user interface 1200 to confirm that the application for validation 110 is properly localized. For example, the user 106 may review the list of text attributes and discover that one of the text attributes are in a language other than that which is desired for a particular localized version. Similarly, the user 106 may easily determine that an unintended or undesired character set is present in the application for validation 110.

Figure 13:
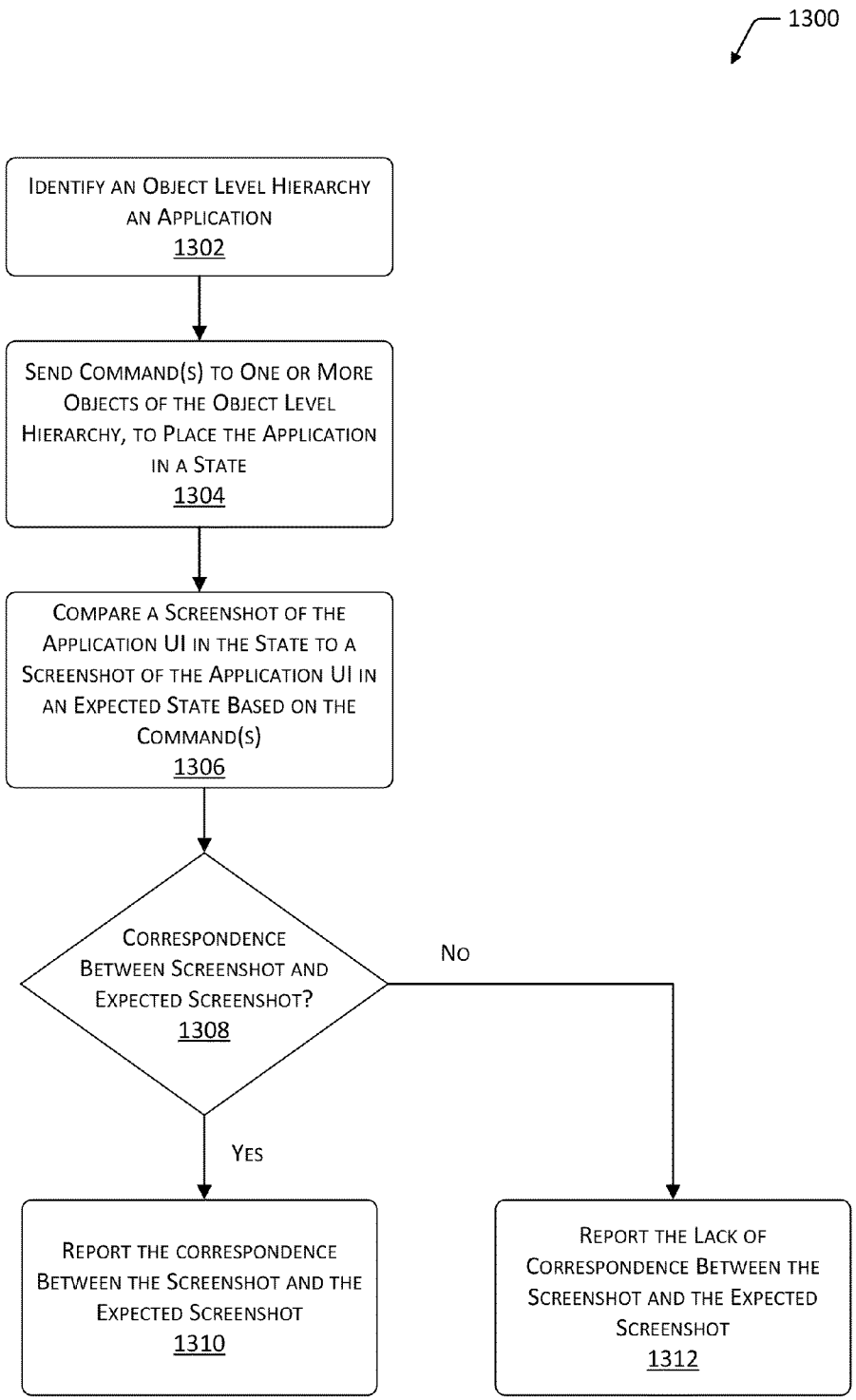
FIG. 13 depicts a flow diagram of a process for validating an application by performing operations on one or more of the objects in its object level hierarchy, and checking for regression following the operations.

FIG. 13 depicts a flow diagram 1300 of a process for validating an application by performing operations on one or more of the objects in its object level hierarchy, and checking for regression following the operations. The process may be implemented by the host device 114, the validation server 108, the client device 104, or a combination thereof.

At 1302, an object level hierarchy is identified for the application. The object level hierarchy may be generated as described above, and stored as the object level hierarchy data 120 on the validation server 108. At 1304, one or more commands may be sent to the executing application for validation 110. Such commands may be to control(s) identified as elements of objects in the object level hierarchy in cases where the object level hierarchy includes data for UI objects associated with the application. In some cases, the commands may be included in a text script and may be arranged to place the application into a particular, expected state.

At 1306, a first screenshot of the application UI is taken following the executed commands, and the first screenshot is compared to a previously generated second screenshot of the application UI in the expected state. At 1308, a comparison is made of the two screenshots to determine a correspondence (or lack thereof) between the two screenshots. If there is a positive correspondence, indicating no difference in the application UI, at 1310 the correspondence is reported. If there is a negative correspondence, indicating at least one difference, at 1312 the lack of correspondence is reported.

In either case, the information indicating correspondence or lack of correspondence between the screenshots may comprise the validation result data 122, and may be reported to the user 106 through the validation user interface module 214. In some embodiments, the validation result data 122 may be stored on the validation server 108 and provided to a user or process in response to a request for the data.

In some embodiments, sending commands to objects of an object level hierarchy, taking screenshots of the application UI, and the screenshots comparison may be performed as described in U.S. patent application Ser. No. 13/619, 867, filed on Sep. 14, 2012, titled "Remote Control of a Mobile Device," incorporated by reference above. Test scripts or test programs may be written to exercise any portion of the functionality of the application under validation, by sending commands to some or all of the objects in the object level hierarchy for the application. In some cases, a test script may enable testing of a complete UI for the application for validation 110 by traversing the object level hierarchy from the top-level object down to each leaf object in the hierarchy, and sending a command to each object that is configured to accept a command. After each command is executed, a comparison may be made of a screenshot of the current state of the application to a screenshot for the expected state, to check for regressions in the application.

Embodiments support the use of both monkey and smart monkey programs to drive a testing process using the object level hierarchy for an application. A monkey program may operate to send an input command (e.g., a touch command) to each object in the hierarchy, regardless of whether the object includes a control that accepts input commands (e.g., a button, a text entry, a dropdown list, and so forth). A smart monkey program may operate to send an input command to those objects that include a control to accept input commands. Such a smart monkey may analyze the object level hierarchy to identify those objects able to accept input commands, and send such commands based on its analysis. For example, a smart monkey program may send a touch command to an object that includes a button control, a data input command to an object that includes a data input field, an item selection command to an object that includes a dropdown list control, and so forth. In some embodiments, use of the object level hierarchy for an application may be incorporated into an automated build process to build and validate a version of the application, where a monkey or smart monkey program operates as an automated build test, sniff test for the build, or the like.

Conclusion

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art skill readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications, including those that fall within the scope of the appended claims.

What is claimed is:

1. A computer-implemented method for utilizing processing resources of a computerized system, the computer-implemented method comprising:
   providing, to a host device, an application for validation;
   instructing the host device to execute the application and an assembly code generation module;
   instructing the assembly code generation module to determine a first address of a user interface application view for the application;
   instructing the assembly code generation module to determine a second address for a main window of the application based on the first address;
   instructing the assembly code generation module to traverse a view hierarchy for the main window to generate the assembly code for the application;
   receiving the assembly code from the host device;
   analyzing the assembly code to identify a plurality of objects associated with the application and to determine at least one relationship among the plurality of objects;
   based on the plurality of objects and the at least one relationship, generating an object level hierarchy for the application; and
   validating the application, based at least partly on the object level hierarchy.

2. The method of claim 1, wherein identifying the plurality of objects is based at least partly on searching the assembly code for one or more predetermined patterns which correspond to the plurality of objects.

3. The method of claim 1, wherein the received assembly code is associated with a user interface type of object.

4. The method of claim 1, wherein the validating the application comprises comparing the object level hierarchy with a previously generated object level hierarchy for the application.

5. The method of claim 1, wherein the comparing further includes determining a difference between the object level hierarchy and the previously generated object level hierarchy in at least one of an object identity, an inter-object relationship, or an object attribute.

6. The method of claim 1, wherein the validating the application comprises determining a correspondence between one or more text attributes for the plurality of objects and a target character set for localization of the application.

7. The method claim 1, the operations further comprising:
   receiving the application for validation from a client device; and
   providing to the client device a result of the validating, the result including at least a portion of the object level hierarchy.

8. The method of claim 1, wherein the host device is an emulation of a physical device.

9. The method of claim 1, wherein the determining of the at least one relationship among the plurality of objects is based at least in part on analyzing address data for the plurality of objects within the assembly code.

10. A system comprising:
    at least one memory;
    at least one processor configured to access the at least one memory; and
    at least one application validation module stored in the at least one memory and executed by the at least one processor to:
       receive assembly code generated from execution of an application on a host device, the generating of the assembly code comprising:
          determining a first address in a memory of the host device of a user interface application view for the application;
          determining a second address in the memory of the host device for a main window of the application, the main window being a zero-indexed element of the user interface application view having the first address; and
          traversing a view hierarchy for the main window to generate the assembly code;
       analyze the assembly code to identify a plurality of objects associated with the application and to determine at least one relationship between the plurality of objects;
       based on the plurality of objects and the at least one relationship, generate an object level hierarchy for the application; and
       validate the application based at least in part on the object level hierarchy.

11. The system of claim 10, wherein the assembly code is generated on the host device from execution of an assembly code generation module with reference to the executing application.

12. The system of claim 10, wherein validation of the application comprises:
    comparison of the object level hierarchy of a current version to a baseline object level hierarchy previously generated for a previous version of the application.

13. The system of claim 12, wherein the determination that the current version of the application is valid is further based at least in part on determining that the baseline object level hierarchy includes a plurality of objects that correspond to the plurality of objects in the object level hierarchy of the current version.

14. The system of claim 12, wherein the determination that the current version of the application is valid is further based on determining that the baseline object level hierarchy includes a corresponding relationship among the plurality of objects that correspond to a relationship included in the object level hierarchy.

15. The system of claim 12, wherein the determination that the current version of the application is valid is further based on determining that the baseline object level hierarchy includes a corresponding set of attributes for each of the plurality of objects that correspond to a set of attributes in the object level hierarchy.

16. The system of claim 10, wherein validation of the application comprises:
    designation of a target character set for localizing the application;
    determination of at least one text attribute associated with one or more objects of the object level hierarchy;
    identification of a character set for at least one character of the at least one text attribute; and
    comparison of the target character set to the identified character set.

17. The system of claim 10, wherein the plurality of objects include program objects that correspond to user interface elements of the application.

18. The system of claim 10, wherein the plurality of objects include program objects that correspond to memory management elements of the application.

19. The system of claim 10, wherein the determination of at least one relationship among the plurality of objects is based at least in part on analyzing address data for the plurality of objects within the assembly code.

20. The system of claim 19, wherein the address data includes virtual address data determined by an assembly code generation module during execution of the application.

21. The system of claim 10, wherein identifying the plurality of objects is based at least in part on searching the assembly code for one or more predetermined patterns.

22. The system of claim 10, wherein receiving the assembly code is responsive to a plurality of iterated requests to the host device, each iteration configured to request information for a parent relationship of a first object to a second object in the plurality of objects.

23. A system comprising:
a host device, including an assembly code generation module to generate assembly code for an application executing on the host device, wherein the host device operates to:
determine a first address of a user interface application view for the application;
determine a second address of a main window of the application, the main window being an initially indexed element of the user interface application view having the first address; and
traverse a view hierarchy for the main window of the application, to generate the assembly code; and
a server device in communication with the host device, the server device including at least one module stored in at least one memory of the server device and executed by at least one processor of the server device to:
receive at least a portion of the assembly code from the host device;
analyze the received assembly code to identify a plurality of objects associated with the application and to determine at least one relationship among the plurality of objects; and
based on the plurality of objects and the at least one relationship, generate an object level hierarchy for the application, the object level hierarchy indicating a hierarchical association between the plurality of objects.

24. The system of claim 23, wherein the host device further operates to:
receive the application from the server device or another device external to the host device;
execute the application;
execute the assembly code generation module to generate the assembly code for the executing application; and
provide at least the portion of the assembly code to the server device.

25. The system of claim 23, wherein the server device is in communication with the host device using a wired connection and the assembly code is provided over the wired connection from the host device to the server device.

26. The system of claim 23, wherein the host device further operates to:
extract, from the assembly code, the portion of the assembly code corresponding to an object type; and
provide the portion of the assembly code to the server device.

27. The system of claim 26, wherein the object type is a user interface object type.

28. The system of claim 23, wherein the determining of the at least one relationship among the plurality of objects is based at least in part on analyzing address data for the plurality of objects within the assembly code.

29. The system of claim 23, wherein the receiving of at least the portion of the assembly code is responsive to a plurality of iterated requests to the host device, each iterated request being to request information for a parent relationship of a first object to a second object in the plurality of objects.

30. The system of claim 23, wherein the host device is an emulation of a physical device.

* * * * *